S. W. CADY.
TANDEM DISK HARROW.
APPLICATION FILED NOV. 22, 1918.
1,336,676.
Patented Apr. 13, 1920.
2 SHEETS—SHEET 1.
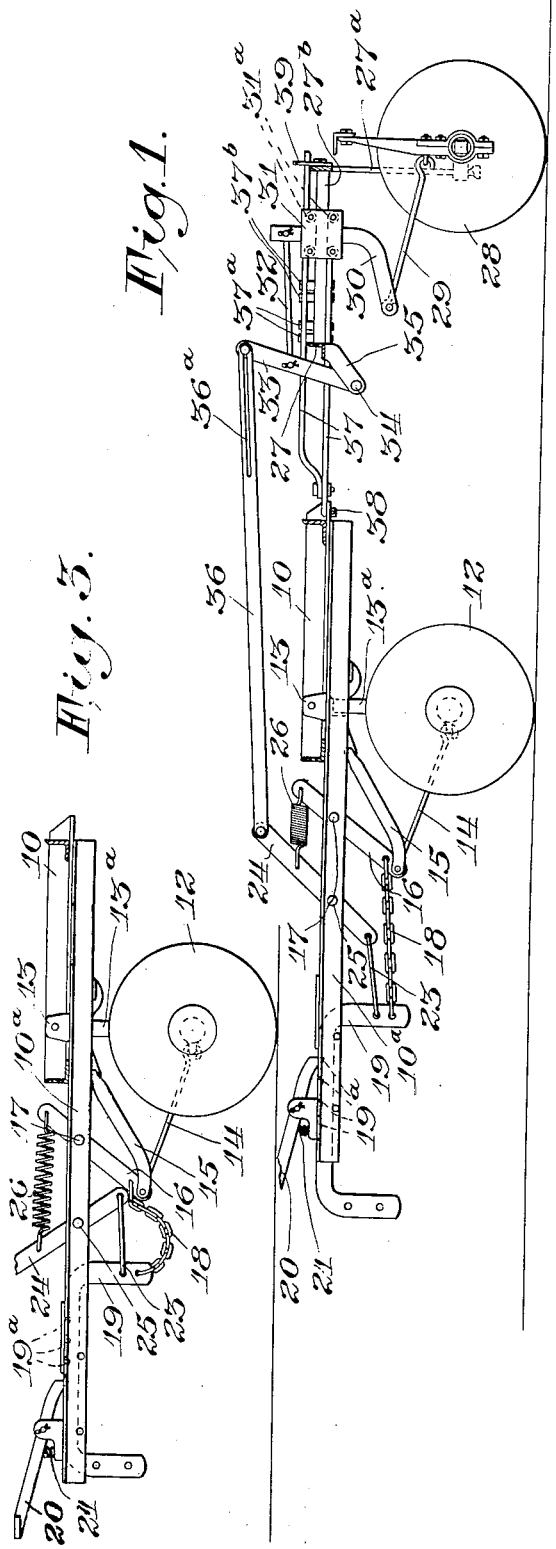
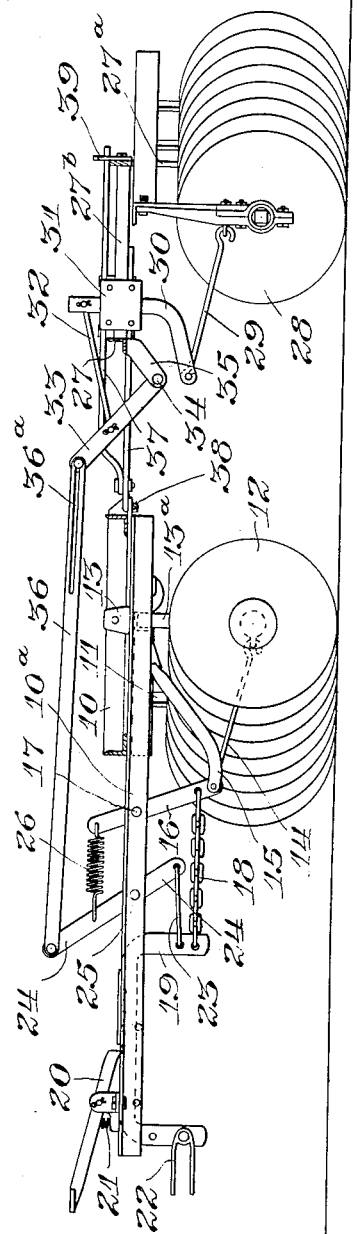
Inventor.
Sherman W. Cady,
By Chas. E. Lord
Atty.

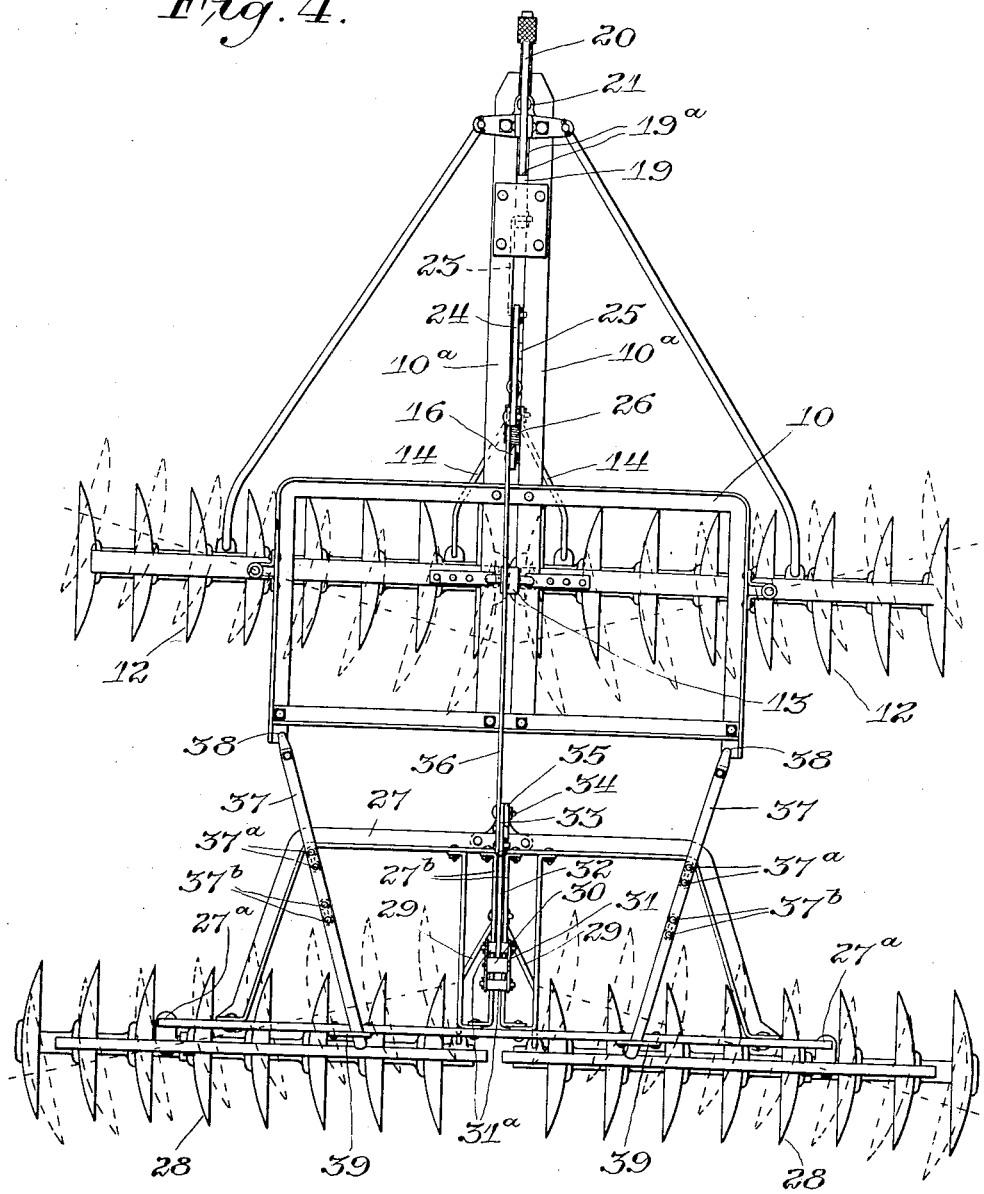

UNITED STATES PATENT OFFICE.

SHERMAN W. CADY, OF AUBURN, NEW YORK, ASSIGNOR TO INTERNATIONAL HARVESTER COMPANY, A CORPORATION OF NEW JERSEY.

TANDEM DISK HARROW.

1,336,676.  Specification of Letters Patent.  Patented Apr. 13, 1920.

Application filed November 22, 1918. Serial No. 263,732.

*To all whom it may concern:*

Be it known that I, SHERMAN W. CADY, a citizen of the United States, residing at Auburn, in the county of Cayuga and State of New York, have invented certain new and useful Improvements in Tandem Disk Harrows, of which the following is a full, clear, and exact specification..

This invention relates to disk harrows.

It is very desirable, if not absolutely necessary, that the front gangs of a double disk harrow as well as the rear gangs automatically straighten in backing. It is absolutely imperative that the rear gangs automatically straighten if the harrow is backed any distance, otherwise if the disks sink into the soil at all, the front frame will rise and turn over the rear disks and a broken harrow will result. If, however, we are able to straighten both sets of gangs in backing, there is no danger and the harrow can safety be backed even in the softest soil in which it would be used.

Having straightened the harrow gangs it is a great convenience in operation to be able to have the gangs assume their angle on a forward pull without any further action on the part of the operator.

An object, therefore, of this invention, is to provide a harrow in which the front harrow gangs will straighten as the harrow is backed and with the same setting of the harrow angling mechanism will tend to force the gangs into angle as the harrow is drawn forward.

Another object of this invention is to provide a double disk harrow which will automatically straighten all gangs in the operation of backing and which will automatically angle all gangs when the harrow is again advanced.

Another object is to combine both the foregoing objects with a means for setting the angle of the gangs in backing and causing the gangs to assume the angle so set on a forward pull. By setting the angle in backing, I mean that the angle mechanism contains elements which can be adjusted by the operation of backing to give a certain amount of angle to the gangs when the harrow is next moved forward, but which at the same time permits the gangs to straighten as long as the backing continues.

These and other objects are accomplished by my invention which comprises a harrow having a frame, disk gangs carried thereby, sliding draft connections operable by a tractor for angling the gangs, and a yielding means between said connections and the gangs.

Referring now to the drawing,—

Figure 1 is a partial longitudinal vertical section just to the left of the center line showing the gangs straightened as in going ahead;

Fig. 2 is the same with the gangs angled as when the harrow is going ahead;

Fig. 3 is the same but showing only the front section with the gangs straightened and the spring stretched as in backing; and Fig. 4 is a plan view of a double disk harrow showing front and rear sections operatively connected together.

I have illustrated my invention in connection with a double disk harrow having front and rear sections. The front section has a frame 10 upon which is hingedly mounted at 11 a pair of disk gangs 12. These are so placed that a greater number of disks is placed inside the pivotal point so that as the harrow is moved forward the tendency is for the inner ends of the gangs of the front section to move back and form an angle with the frame. The inner ends of the gangs are connected by means of a standard 13ᵃ to a sliding block 13 which is adapted to slide between the draft angles 10ᵃ. The inner ends of the gangs and the sliding block are connected by links 14 and 15, respectively, to a lever 16 which is pivotally connected to the draft angles 10ᵃ at 17. This lever is connected preferably by means of a chain 18 to the draft bar 19 which is slidably mounted between the draft angles 10ᵃ. This draft bar has a series of rigid teeth 19ᵃ which are engaged by a foot lever 20 which is actuated by a spring 21. Connection is made to the tractor by means of a clevis or other suitable mounting 22. The foot lever 20 is so placed that it can be easily operated by the tractor operator from his seat. The draft bar 19 is connected by means of a link 23 to a lever 24 which is hingedly mounted on the draft angles at 25. A coiled spring 26 connects the upper ends of the two levers 16 and 24.

The rear harrow has a frame 27 on which is pivotally mounted two disk gangs 28 on the vertical pivots 27ᵃ. These pivots are so placed that the greater number of gangs falls inside the pivot points. The inner ends of the gangs are connected by links 29 to a bar 30 which is rigidly carried by a block 31 which is made slidable upon horizontal guides 27ᵇ of the frame 27. Rollers 31ᵃ are preferably added to decrease the friction.

The upper end of the bar 30 is connected by means of a link 32 to a lever 33; this lever is pivotally connected at 34 to a bracket 35 which is rigidly secured to the rear frame 27. The lever 33 is connected to the lever 24 of the front section by means of a link 36 which has a slot 36ᵃ in engagement with the pin at the upper end of the lever 33. Connection is made between the front and rear sections by means of sliding members 37 which are placed at the two rear corners of the front frame 10 and pivotally connected thereto at 38. Each of these sliding members is made up of an upper and a lower portion bolted together at 37ᵃ and 37ᵇ. The upper section slides back over the top of the rear frame and through a U-shaped cleat 39. Blocks are bolted at 37ᵃ and 37ᵇ which strike inside the rear frame to take the draft.

This method of connecting the two sections together with the slot 36ᵃ of the link 36 allows them to approach each other in backing or in turning a corner.

The operation of this harrow is as follows:

As the harrow is backed the draft bar 19 will be forced back causing the upper end of the levers 24 and 33 to be drawn forward, thereby tending to set the angle for the rear gangs. However, owing to the telescoping action just described, the rear gangs will not be actually forced into angle as soon as the harrow is backed, but as soon as the harrow is again pulled forward the two harrow sections will again be drawn apart and the slack in the connecting links removed and the rear sections angled. At the same time the front gangs will tend to straighten in backing owing to the fact that the overhang in the front gangs tends to straighten them as they back, and this tendency will be strong enough to overcome the tension of the spring 26. The position of the front gangs after the operation of backing and before the harrow has again been drawn forward, is shown in Fig. 3. If the harrow is now drawn forward the tendency of the front gangs is to angle themselves, but if they happen to be running over hard ground, this tendency will not be sufficient to start them, and the spring 26 is accordingly added to give them this initial impulse. Once the angling is started, the disks will bite into the soil and the gangs will automatically complete the angling operation.

While I have in the above specification shown and described but a single embodiment of my invention, it is to be understood that it is capable of many modifications. Changes therefore, in the construction and arrangement of parts may be made which do not depart from the spirit and scope of the invention as disclosed in the appended claims:

1. In a harrow, a frame, disk gangs carried thereby, sliding draft connections operable by the draft power for angling the gangs, and a resilient connecting means between the sliding connection and the gangs.

2. In a harrow, a frame, disk gangs carried thereby, sliding draft connections operable by the draft power and controllable from a point outside the harrow for angling the gangs, and a resilient connecting means between the sliding connections and the gangs.

3. In a harrow, a frame, disk gangs carried thereby, sliding draft connections operable by the draft power for angling the gangs, and a resilient connecting means between the sliding connections and the gangs tending to force the gangs into angle upon forward movement of the harrow.

4. In a harrow, a frame, disk gangs carried thereby, draft connections slidable on said frame by the action of the draft power for changing the angle of the gangs, and a resilient connecting means between the sliding draft connections and the gangs.

5. In a harrow, a frame, disk gangs carried thereby, draft connections slidable on said frame by the action of the draft power and controllable from a point outside the harrow for changing the angle of the gangs, and a resilient connecting means between the sliding draft connections and the gangs.

6. In a harrow, front and rear sections, disk gangs thereon, draft connections slidable on the front section by the action of the draft power for changing the angle of the gangs, a resilient connecting means between the sliding draft connections and the front gangs, and a connection between said draft connection and the rear gangs for angling said rear gangs.

7. In a harrow, front and rear sections, disk gangs thereon, draft connections slidable on the front section by the action of the draft power for changing the angle of the gangs, a resilient connecting means between the sliding draft connections and the front gangs, and a connection between said draft connection and the rear gangs for angling said rear gangs including means for simultaneously angling both sets of gangs.

8. In a harrow, front and rear sections, disk gangs carried thereby, draft elements, means for setting the angle of both gangs by a push on said draft elements while the gangs are still substantially straight, and means for causing the gangs to assume the angle so set on a forward pull on said draft elements.

9. In a harrow, front and rear sections, disk gangs carried thereby, draft elements, means for setting the angle of both gangs by a push on said draft elements while the gangs are still substantially straight, means for causing the gangs to assume the angle so set on a forward pull on said draft elements, and means for releasing the angle on a forward pull.

10. In a harrow, front and rear sections, disk gangs carried thereby, draft elements, means for setting the angle of both gangs by a push on said draft elements while the gangs are still substantially straight, means for causing the gangs to assume the angle so set on a forward pull on said draft elements, and means operable from a point outside the harrow for releasing the angle on a forward pull.

In testimony whereof I affix my signature.

SHERMAN W. CADY.